US008068796B2

(12) United States Patent
Wu et al.

(10) Patent No.: US 8,068,796 B2
(45) Date of Patent: Nov. 29, 2011

(54) POWER DIVIDER AND DUAL-OUTPUT RADIO TRANSMITTER

(75) Inventors: Min-Chung Wu, Taoyuan County (TW); Shao-Chin Lo, Miaoli (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 235 days.

(21) Appl. No.: 12/634,692

(22) Filed: Dec. 10, 2009

(65) Prior Publication Data

US 2010/0330939 A1 Dec. 30, 2010

(30) Foreign Application Priority Data

Jun. 24, 2009 (TW) ................................ 98121177 A

(51) Int. Cl.
*H04B 1/03* (2006.01)
*H04B 1/28* (2006.01)

(52) U.S. Cl. ......................... 455/103; 455/333; 333/128

(58) Field of Classification Search .................. 455/333, 455/552.1, 91, 101, 103, 327; 333/128, 238, 333/124, 125
See application file for complete search history.

(56) References Cited

U.S. PATENT DOCUMENTS 4,644,302 A * 2/1987 Harris et al. .................. 333/125
6,906,373 B2 * 6/2005 Lee .............................. 257/303
7,324,060 B2 * 1/2008 Quan et al. .................... 343/853
2007/0046393 A1 * 3/2007 Quan et al. .................... 333/128
2009/0273413 A1 * 11/2009 Zhang et al. .................. 333/124
2010/0210208 A1 * 8/2010 Gorbachov .................. 455/41.2
2010/0321131 A1 * 12/2010 Tsai et al. ..................... 333/128
2011/0032049 A1 * 2/2011 Tahara et al. ................. 333/128

OTHER PUBLICATIONS

Wu, Title of Invention: Broadband Coupling Filter, U.S. Appl. No. 12/911,738, filed Oct. 26, 2010.

* cited by examiner

*Primary Examiner* — Sonny Trinh
(74) *Attorney, Agent, or Firm* — Winston Hsu; Scott Margo

(57) ABSTRACT

A power divider includes a substrate, a signal reception terminal formed in a first layer of the substrate for receiving signals, a first output terminal formed in the first layer for outputting radio-frequency (RF) signals, a matching terminal formed in a third layer of the substrate, a second output terminal formed in the third layer for outputting RF signals, a grounding plate formed in a second layer of the substrate, surrounding a hole and forming a circular shape, a first block transmission line formed at a position corresponding to the hole in the first layer and coupled to the signal reception terminal and the first output terminal, and a second block transmission line formed at a position corresponding to the hole in the third layer, coupled to the matching terminal and the second output terminal, and having a shape identical to a shape of the first block transmission line.

22 Claims, 8 Drawing Sheets

POWER DIVIDER AND DUAL-OUTPUT RADIO TRANSMITTER

BACKGROUND OF THE INVENTION

1. Field of the Invention

The present invention relates to a power divider and a dual-output radio transmitter, and more particularly, to a power divider and dual-output radio transmitter has small volume and simple structure, and is suitable for multi-band or wideband operations.

2. Description of the Prior Art

With the advancement of wireless communication, wireless communication systems supporting multi-input and multi-output (MIMO) technology, such as IEEE 802.11 compatible systems, are increasing in number, in order to improve transmission efficiency and rate, as well as quality of services. The concept of MIMO is to transmit and receive radio signals via multiple (or multi-set of) antennas, such that system throughput and transmitting range can be increased without additional bandwidth or transmit power expenditure, and thus, spectrum efficiency and transmitting rate can be enhanced.

To transmit and receive signals via smart antennas in a MIMO system, a corresponding radio-frequency (RF) processing circuit is required to properly distribute transmitting signals to each antenna. Therefore, a power divider is necessary. For example, in a 2T/2R (2 transmitters, 2 receivers) MIMO system, an RF signal processing circuit may divide a signal into two RF signals with the same power and 90-degree phase difference, so as to emit the two RF signals via two transmission antennas. The power divider capable of reaching 90-degree phase difference is an important component in the field of RF signal processing. However, the prior art power divider of 90-degree phase difference requires large layout area. Besides that, the prior art power divider is usually designed for narrow band or single band applications, leading to increase of power consumption and deviation of phase difference when the power divider is used in wideband or multi-band operations.

SUMMARY OF THE INVENTION

It is therefore a primary objective of the present invention to provide a power divider and dual-output radio transmitter.

The present invention discloses a power divider, which comprises a substrate, a signal reception terminal, a first output terminal, an impedance matching terminal, a second output terminal, a grounding plate, a first block transmission line, and a second block transmission line. The signal reception terminal comprises a first layer, a second layer and a third layer. The second layer is formed between the first layer and the third layer. The signal reception terminal is formed in the first layer of the substrate for receiving a signal to be transmitted. The first output terminal is formed in the first layer of the substrate for outputting a first radio-frequency signal. The impedance matching terminal is formed in the third layer of the substrate for coupling with an impedance. The second output terminal is formed in the third layer of the substrate for outputting a second radio-frequency signal. The grounding plate is formed in the second layer of the substrate, and surrounds a hole and forms a circular shape. The first block transmission line is formed at a position corresponding to the hole in the first layer of the substrate and coupled to the signal reception terminal and the first output terminal. The second block transmission line is formed at a position corresponding to the hole in the third layer of the substrate and coupled to the impedance matching terminal and the second output terminal, and has a shape identical to a shape of the first block transmission line.

The present invention further discloses a dual-output radio transmitter, which comprises a radio-frequency signal processing circuit for generating a signal to be transmitted, a first antenna, a second antenna and a power divider. The power divider comprises a substrate, a signal reception terminal, a first output terminal, an impedance matching terminal, a second output terminal, a grounding plate, a first block transmission line, and a second block transmission line. The substrate comprises a first layer, a second layer and a third layer. The second layer is formed between the first layer and the third layer. The signal reception terminal is formed in the first layer of the substrate for receiving the signal to be transmitted. The first output terminal is formed in the first layer of the substrate for outputting a first radio-frequency signal to the first antenna. The impedance matching terminal is formed in the third layer of the substrate for coupling with an impedance. The second output terminal is formed in the third layer of the substrate for outputting a second radio-frequency signal to the second antenna. The grounding plate is formed in the second layer of the substrate, and surrounds a hole and forms a circular shape. The first block transmission line is formed at a position corresponding to the hole in the first layer of the substrate and coupled to the signal reception terminal and the first output terminal. The second block transmission line is formed at a position corresponding to the hole in the third layer of the substrate and coupled to the impedance matching terminal and the second output terminal, and has a shape identical to a shape of the first block transmission line.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
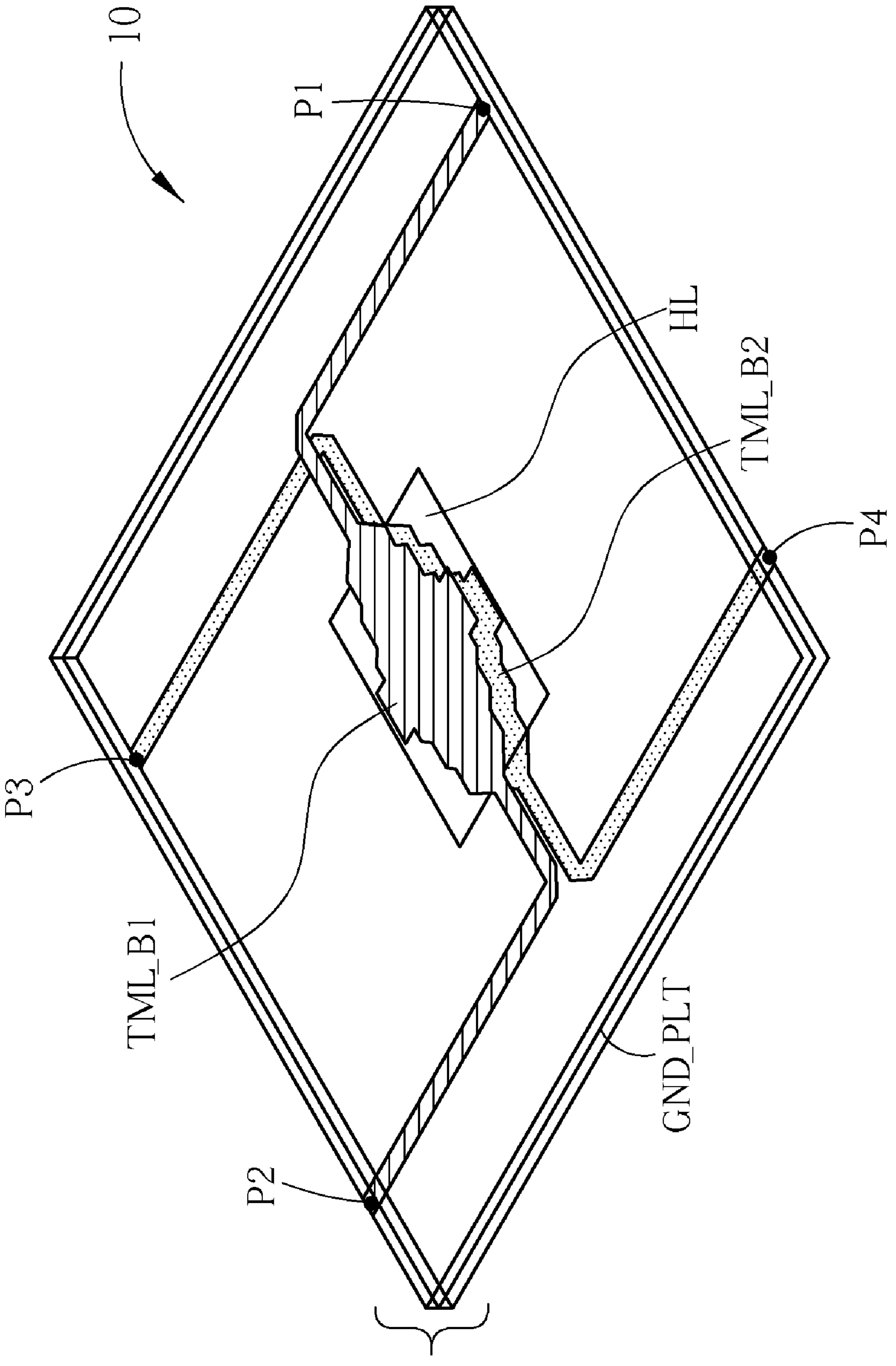
FIG. 1A is a schematic diagram of a power divider according to an embodiment of the present invention.
Figure 1B:
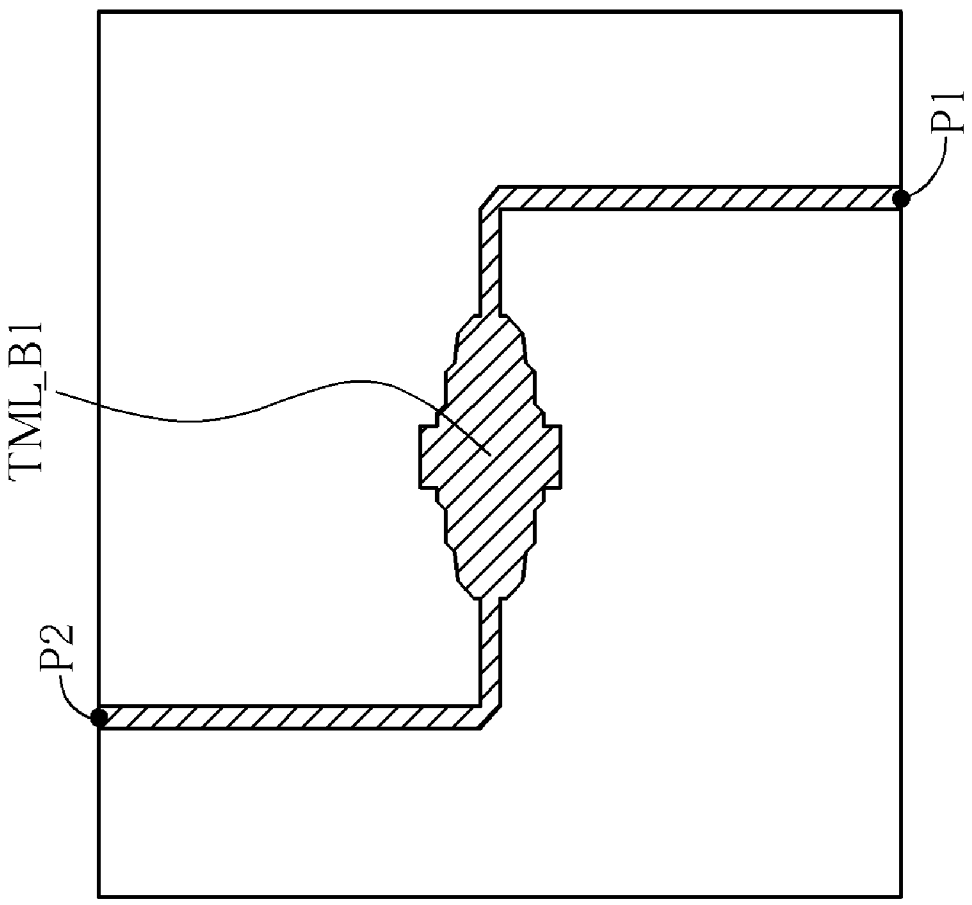
FIGS. 1B-1D are schematic diagrams of layers of the power divider shown in FIG. 1A.
Figure 1C:
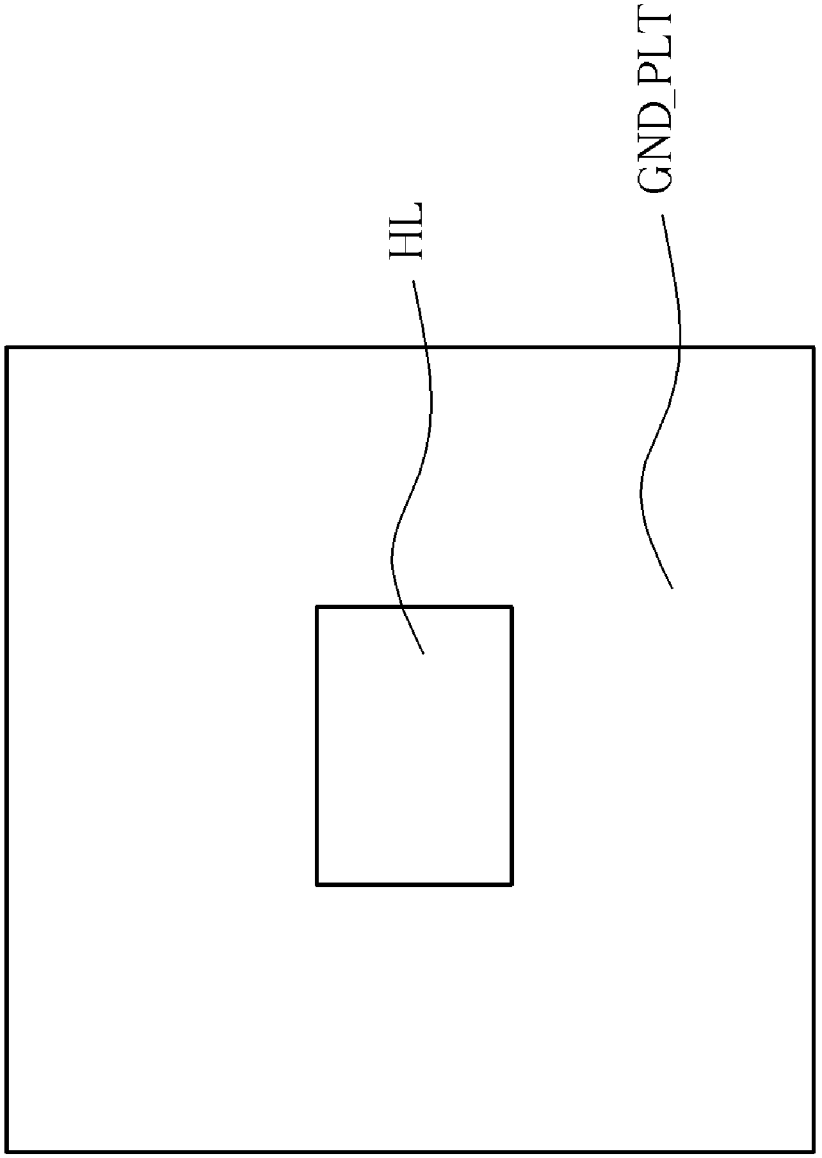
Figure 1D:
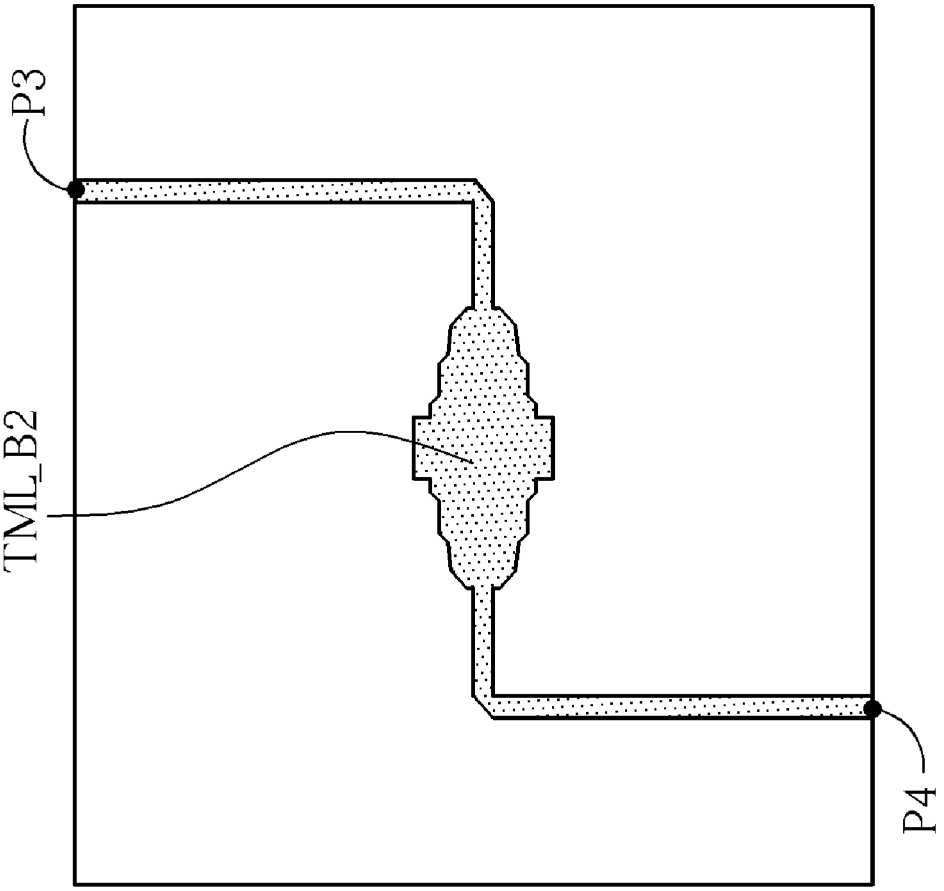

Please refer to FIGS. 1A-1D. FIG. 1A is a schematic diagram of a power divider 10 according to an embodiment of the present invention, and FIGS. 1B-1D are schematic diagrams of the layers of the power divider 10. The power divider 10 comprises a substrate 100, a signal reception terminal P1, output terminals P2 and P3, an impedance matching terminal P4, a grounding plate GND_PLT, and block transmission lines TML_B1 and TML_B2. The signal reception terminal P1 is utilized for receiving signals to be transmitted, the output terminals P2 and P3 are utilized for outputting radio-frequency (RF) signals, and the impedance matching terminal P4 is coupled to an impedance (not shown in FIGS. 1A-1D), such as 50 ohms. In addition, a difference between electrical paths of the RF signals of the output terminals P2 and P3 when passing through the block transmission lines TML_B1 and TML_B2 is a quarter of a wavelength of the signal to be transmitted. Structurally, the substrate 100 is a 3-layer printed circuit board, in which an upper layer (shown in FIG. 1B) includes a signal reception terminal P1, an output terminal P2 and a block transmission line TML_B1 being printed, a middle layer (shown in FIG. 1C) includes a grounding plate GND_PLT being printed, and a lower layer (shown in FIG. 1C) includes an output terminal P3, an impedance matching terminal P4 and a block transmission line TML_B2 being printed. Moreover, as can be seen from FIGS. 1A to 1D, the grounding plate GND_PLT surrounds a hole HL, and the block transmission lines TML_B1 and TML_B2 having identical shapes are set above and below the hole HL respectively. In such a situation, since the block transmission lines TML_B1 and TML_B2 are not isolated from each other by the grounding plate GND_PLT, the RF signals of the output terminal P2 and P3 have 90-degree phase difference via signal coupling effect. In addition, the distance between the block transmission lines TML_B1 and TML_B2 is related to a thickness of the middle layer of the substrate 100, and can determine how much energy is coupled from the block transmission line TML_B1 to the block transmission line TML_B2, such as 3 db, 6 db or other ratios.

On the other hand, widths of the block transmission lines TML_B1 and TML_B2 are not fixed but varied from narrow to wide and wide to narrow. In other words, signals passing through the block transmission line TML_B1 (which is received by the signal reception terminal P1) encounter impedance changing from low to high and then high to low; therefore, via coupling effect, energy of the signal received by the signal reception terminal P1 is distributed to the output terminals P2 and P3 according to a specific ratio related to shape variations of the block transmission lines TML_B1 and TML_B2. In other words, the shapes of the block transmission lines TML_B1 and TML_B2 are highly related to the energy distribution of the output terminals P2 and P3. In addition, since the grounding plate GND_PLT influences the signal coupling effect between the block transmission lines TML_B1 and TML_B2, the shape of the hole HL can influence the energy distribution of the output terminals P2 and P3. In such a situation, a designer could adjust the shapes of the block transmission lines TML_B1, TML_B2 and the hole HL, to reach a specific energy ratio between the RF signals of the output terminals P2 and P3. For example, RF signals with the same power could be generated for a 2T/2R system.

Briefly, the present invention can generate RF signals with 90-degree phase difference from the output terminals P2 and P3 via the block transmission lines TML_B1 and TML_B2, and control the signal power ratio between the output terminals P2 and P3 by adjusting the shapes of the block transmission lines TML_B1, TML_B2 or the hole HL. The present invention uses the coupling effect between the block transmission lines TML_B1 and TML_B2 to reach purposes of power dividing and 90-degree phase difference without combining passive devices (such as inductors, capacitors, etc.). Therefore, the present invention can be applied for multi-band or wideband applications.

Figure 2:
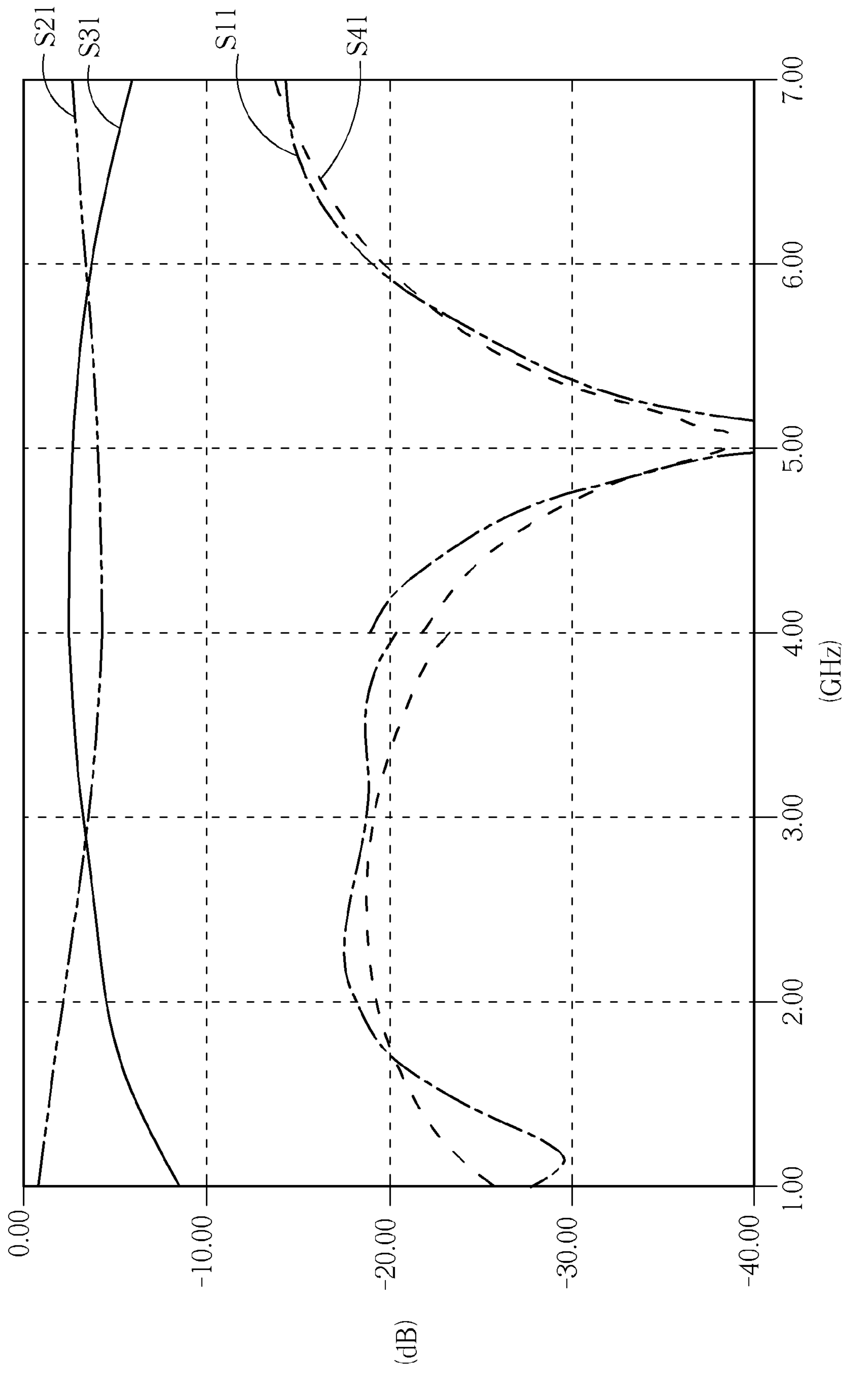
FIG. 2 is a schematic diagram of frequency response of the power divider shown in FIG. 1A.
Figure 3:
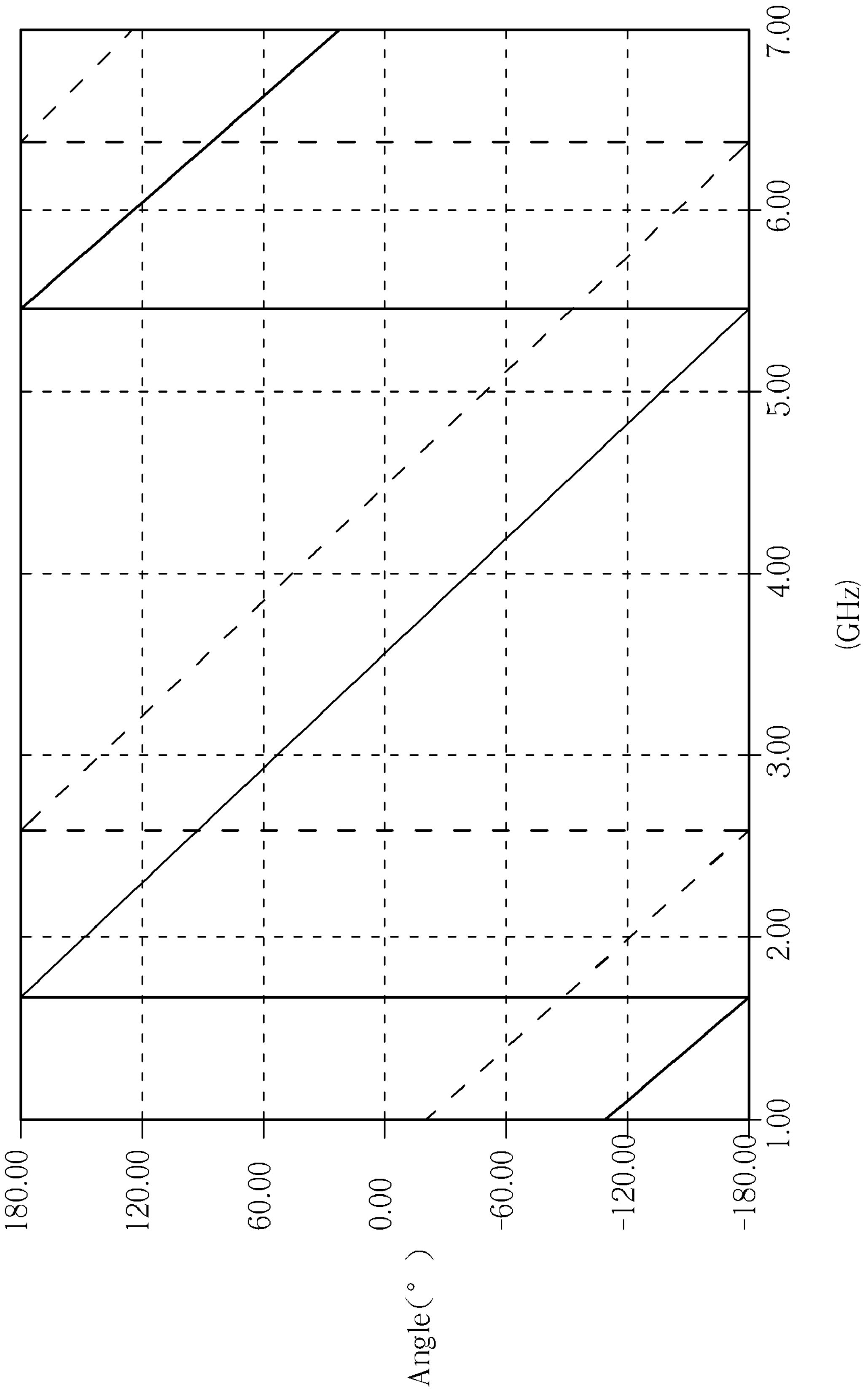
FIG. 3 is a schematic diagram of phase difference of the power divider shown in FIG. 1A.

For example, for a wireless communication system conforming to IEEE 802.11, a size of the power divider 10 can be properly adjusted to reach frequency response as shown in FIG. 2 and phase difference as shown in FIG. 3. In FIG. 2, a curve S21 represents ratios of energy transmitted (coupled) from the signal reception terminal P1 to the output terminal P2 in different frequencies, a curve S31 represents ratios of energy transmitted (coupled) from the signal reception terminal P1 to the output terminal P3 in different frequencies, a curve S11 represents ratios of energy transmitted and reflected to the signal reception terminal P1 in different frequencies, and a curve S41 represents ratios of energy transmitted (coupled) from the signal reception terminal P1 to the impedance matching terminal P4. Therefore, as can be seen from FIG. 2, in the operating frequency band of IEEE 802.11, i.e. around 2.4 GHz and 5 GHz, amplitudes of the curves S21 and S31 are about −3 db, representing that the signal energies of the output terminals P2 and P3 are half the signal energy of the signal reception terminal P1. In addition, in FIG. 3, a dashed line represents signal phases of the output terminal P2, and a solid line represents signal phases of the output terminal P3; thus, phase difference between the output terminal P2 and the output terminal P3 is 90 degrees. Therefore, as can be seen from FIGS. 2-3, in IEEE 802.11 operating frequencies, the power divider 10 could output RF signals with the same power and 90-degree phase difference. In other words, the present invention is suitable for multi-band and wideband applications.

In addition, since there is no complicated element in the power divider 10, the layout area can be reduced, so as to enhance product competitiveness. On the other hand, when the power divider 10 is applied to a radio transmitter, the power divider 10 can be set between an RF signal processing circuit and multi-antenna (two antennas), that is, to couple the signal reception terminal P1 to the RF signal processing circuit, and couple the output terminals P2 and P3 to the two antennas respectively, such that the power divider 10 can distribute signals outputted from the RF signal processing circuit to the output terminals P2 and P3, and let signals of the output terminals P2 and P3 have 90-degree phase difference and identical or specific-ratio power.

Figure 4:
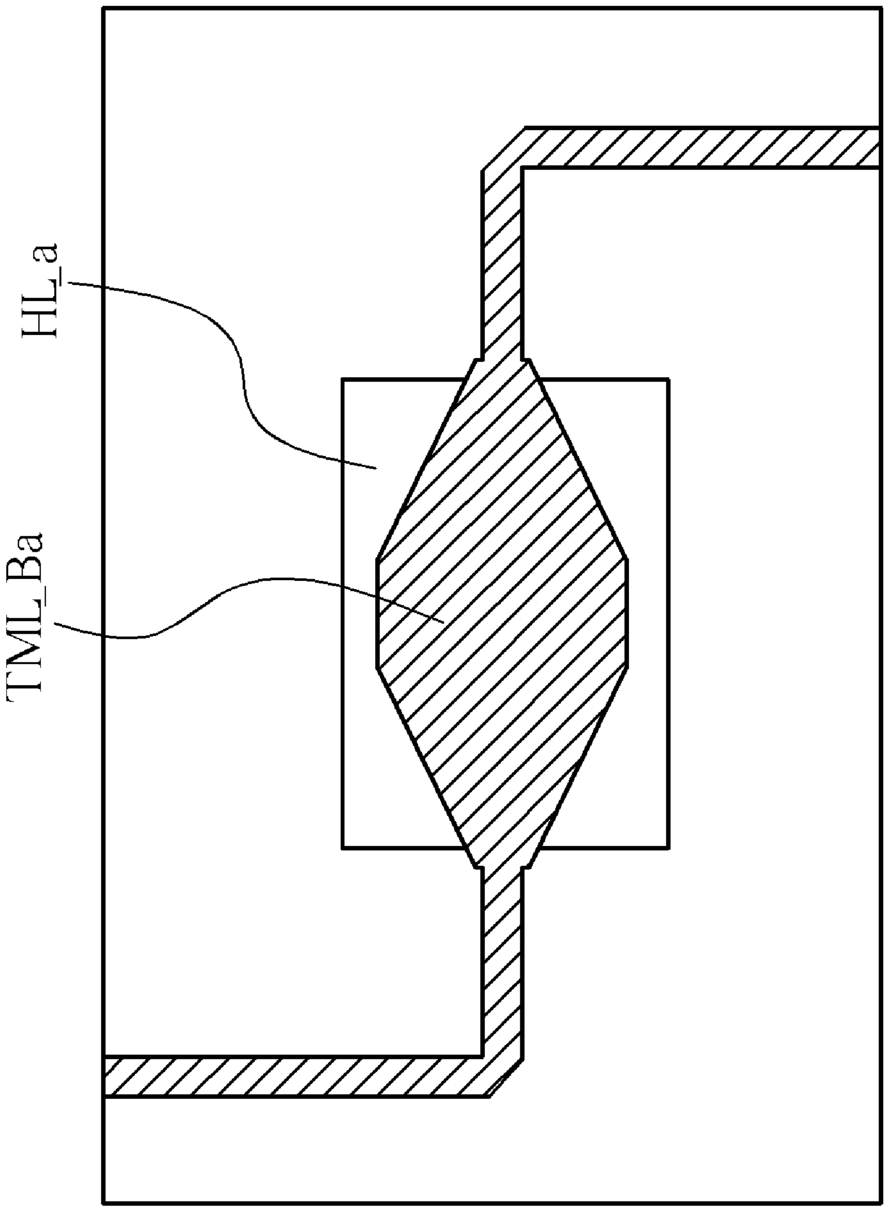
FIG. 4 is a schematic diagram of another embodiment of the present invention.
Figure 5:
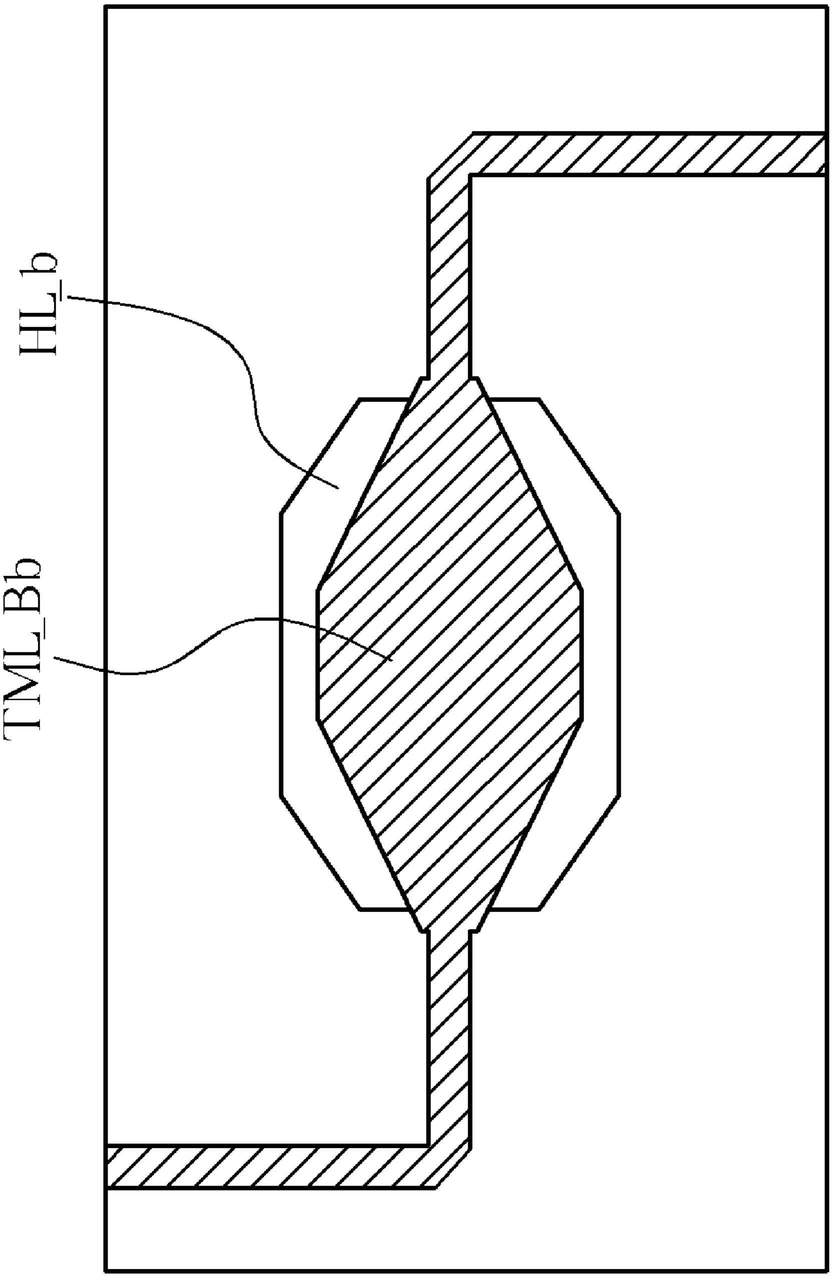
FIG. 5 is a schematic diagram of another embodiment of the present invention.

Note that, the power divider 10 shown in FIGS. 1A-1D is an embodiment of the present invention, and those skilled in the art can properly modify shapes, sizes, or materials of each element according to a required power ratio or an operating frequency band. For example, in FIG. 4, a shape of a block transmission line TML_Ba increases linearly then decreases linearly by the same tendency, and a corresponding hole HL_a is rectangular. In FIG. 5, a shape of a block transmission line TML_Bb is identical to that of the block transmission line TML_Ba, while a corresponding hole HL_b is octagonal. Certainly, FIG. 4 and FIG. 5 are used to illustrate possible modifications of the present invention, and not to limit the scope of the present invention.

In the prior art, the power divider requires greater layout area, and is not suitable for wideband and multi-band operations. In comparison, the present invention does not require complicated elements, is capable of reducing layout area, and suitable for multi-band or wideband applications. Except for outputting RF signals with 90-degree phase difference, the present invention can further adjust the power ratio of the RF signals via modifying the shapes of the block transmission lines or the hole of the grounding plate, in order to broaden the application range.

In conclusion, the present invention generates RF signals with 90-degree phase difference via the coupling effect and adjusts the power ratio of the RF signals via modifying the shapes of the block transmission lines or the hole of the grounding plate. Therefore, the power divider of the present invention has advantages of small volume and simple structure, and is suitable for multi-band or wideband operations.

Those skilled in the art will readily observe that numerous modifications and alterations of the device and method may be made while retaining the teachings of the invention.

What is claimed is:

1. A power divider comprising:

a substrate comprising a first layer, a second layer and a third layer, the second layer formed between the first layer and the third layer;

a signal reception terminal, formed in the first layer of the substrate, for receiving a signal to be transmitted;

a first output terminal, formed in the first layer of the substrate, for outputting a first radio-frequency signal;

an impedance matching terminal, formed in the third layer of the substrate, for coupling with an impedance;

a second output terminal, formed in the third layer of the substrate, for outputting a second radio-frequency signal;

a grounding plate, formed in the second layer of the substrate, surrounding a hole and forming a circular shape;

a first block transmission line, formed at a position corresponding to the hole in the first layer of the substrate and coupled to the signal reception terminal and the first output terminal; and a second block transmission line, formed at a position corresponding to the hole in the third layer of the substrate and coupled to the impedance matching terminal and the second output terminal, and having a shape identical to a shape of the first block transmission line.

2. The power divider of claim 1, wherein a difference between electrical paths of the first radio-frequency signal passing through the first block transmission line and the second radio-frequency signal passing through the second block transmission line is a quarter of a wavelength of the signal to be transmitted.

3. The power divider of claim 1, wherein a phase difference between the first radio-frequency signal and the second radio-frequency signal is 90 degrees.

4. The power divider of claim 1, wherein a total energy of the first radio-frequency signal and the second radio-frequency signal is equal to energy of the signal to be transmitted.

5. The power divider of claim 1, wherein a shape of the hole is related to an energy ratio of the first radio-frequency signal to the second radio-frequency signal.

6. The power divider of claim 1, wherein the hole is rectangular.

7. The power divider of claim 1, wherein the hole is octagonal.

8. The power divider of claim 1, wherein an area of the hole projected on the second layer of the substrate is greater than an area of the first block transmission line projected on the first layer of the substrate.

9. The power divider of claim 1, wherein shapes of the first block transmission line and the second block transmission line are related to an energy ratio of the first radio-frequency signal to the second radio-frequency signal.

10. The power divider of claim 1, wherein a width of an area of the first block transmission line projected on the first layer of the substrate changes from narrow to wide and to narrow.

11. The power divider of claim 1, wherein the impedance is 50 ohms.

12. A dual-output radio transmitter comprising:

a radio-frequency signal processing circuit, for generating a signal to be transmitted;

a first antenna;

a second antenna; and a power divider comprising;

a substrate comprising a first layer, a second layer and a third layer, the second layer formed between the first layer and the third layer;

a signal reception terminal, formed in the first layer of the substrate, for receiving the signal to be transmitted;

a first output terminal, formed in the first layer of the substrate, for outputting a first radio-frequency signal to the first antenna;

an impedance matching terminal, formed in the third layer of the substrate, for coupling with an impedance;

a second output terminal, formed in the third layer of the substrate, for outputting a second radio-frequency signal to the second antenna;

a grounding plate, formed in the second layer of the substrate, surrounding a hole and forming a circular shape;

a first block transmission line, formed at a position corresponding to the hole in the first layer of the substrate and coupled to the signal reception terminal and the first output terminal; and a second block transmission line, formed at a position corresponding to the hole in the third layer of the substrate and coupled to the impedance matching terminal and the second output terminal and having a shape identical to a shape of the first block transmission line.

13. The dual-output radio transmitter of claim 12, wherein a difference between electrical paths of the first radio-frequency signal passing through the first block transmission line and the second radio-frequency signal passing through the second block transmission line is a quarter of a wavelength of the signal to be transmitted.

14. The dual-output radio transmitter of claim 12, wherein a phase difference between the first radio-frequency signal and the second radio-frequency signal is 90 degrees.

15. The dual-output radio transmitter of claim 12, wherein a total energy of the first radio-frequency signal and the second radio-frequency signal is equal to energy of the signal to be transmitted.

16. The dual-output radio transmitter of claim 12, wherein a shape of the hole is related to an energy ratio of the first radio-frequency signal to the second radio-frequency signal.

17. The dual-output radio transmitter of claim 12, wherein the hole is rectangular.

18. The dual-output radio transmitter of claim 12, wherein the hole is octagonal.

19. The dual-output radio transmitter of claim 12, wherein an area of the hole projected on the second layer of the substrate is greater than an area of the first block transmission line projected on the first layer of the substrate.

20. The dual-output radio transmitter of claim 12, wherein shapes of the first block transmission line and the second block transmission line are related to an energy ratio of the first radio-frequency signal to the second radio-frequency signal.

21. The dual-output radio transmitter of claim 12, wherein a width of an area of the first block transmission line projected on the first layer of the substrate changes from narrow to wide and to narrow.

22. The dual-output radio transmitter of claim 12, wherein the impedance is 50 ohms.

* * * * *